June 30, 1970  J. C. DUBOIS  3,518,418
ELECTRO-LUMINESCENT DIODE AND RADIATION PROJECTOR
Filed Dec. 20, 1967  2 Sheets-Sheet 1

INVENTOR.
JEAN C. DUBOIS
BY
AGENT

June 30, 1970  J. C. DUBOIS  3,518,418

ELECTRO-LUMINESCENT DIODE AND RADIATION PROJECTOR

Filed Dec. 20, 1967  2 Sheets-Sheet 2

INVENTOR.
JEAN C. DUBOIS
BY
AGENT

United States Patent Office 3,518,418
Patented June 30, 1970

3,518,418
ELECTRO-LUMINESCENT DIODE AND RADIATION PROJECTOR
Jean Claude Dubois, Caen, France, assignor, by mesne assignments, to U.S. Philips Corporation, New York, N.Y., a corporation of Delaware
Filed Dec. 20, 1967, Ser. No. 692,114
Claims priority, application France, Dec. 21, 1966, 88,372
Int. Cl. F21v 7/06; H01l 11/00; H01j 1/62
U.S. Cl. 240—41.35                                13 Claims

ABSTRACT OF THE DISCLOSURE

An electroluminescent diode having lateral emission in which the semiconductor crystal sides are shaped in a substantially conical formation with the p-n emitting junction extending in a plane perpendicular to the axis of the cone. The advantages include an increased solid angle from which radiation can emerge from the crystal, and reduced absorption losses by arranging the conductivity types in the crystal such that the principal emission occurs via the region having a lower concentration of free charge carriers.

---

In order to enhance the efficiency and the directional effect of an electro-luminescent diode it is known to shape the various faces of the semiconductor crystal of the diode in given forms so that, particularly by utilizing or eliminating the phenomenon of total reflection, portions of the emitted beam, which would otherwise be lost, can be captured and directed. For example, the emitting face of a luminescent diode has been shaped in the form of a spherical segment or the opposite face has been shaped in the form of a paraboloid.

It has furthermore been proposed to shape the semiconductor crystal of a flat diode, which usually has the shape of a cylinder or a parallelepiped, in the form of a truncated cone, the larger base of which, extending substantially parallel to the active junction, constitutes the emissive face of the diode. Thus part of the radiation from the junction, reflected at the conical side faces, can also emerge from the emissive surface and join the radiation emerging directly from the junction through the emissive surface.

It is furthermore known that in optical systems comprising a semiconductor device, particularly, an electroluminescent diode, and a mirror providing by reflecting the beam emerging from the diode a parallel beam, termed radiation projectors, the central portion of this parallel beam is lacking, since the diode itself masks part of the radiation reflected from the mirror, said masked part originating mainly from central parts of the emissive surface of the diode.

In order to raise the efficiency of such projector, particularly of long-range projectors, in which the dispersion should be minimized so that useful energy is restricted to a substantially cylindrical beam, parabolic mirrors are employed so that within a very large solid angle of emission of the radiation from the diode the rays are concentrated by reflections in a parallel beam, whilst diodes situated in the focal plane of the mirror are used which do not or substantially not radiate in an axial direction. Instead of using flat diodes, that is to say, diodes in which the useful beam emanates substantially at right angles from a central region, which is substantially normal to the beam, cylindrical diodes are employed, that is to say, diodes whose crystal has the shape of a cylinder and whose plane of the junction is usually normal to the axis of the cylinder. With such a cylindrical diode the useful beam emanates through the cylindrical part of the surface located in the vicinity of the line of intersection of the junction with this cylindrical surface.

It is known that with such a cylindrical diode the semiconductor crystal has a strong refractive index gradient in a direction transverse of the plane of the junction. Owing to this gradient the light rays are guided along said plane so that they emanate for the major part through surface parts lying in the vicinity of the line of intersection of the junction with the surface. Such diodes are termed lateral-emission diodes.

Such a system, however, exhibits still great losses of energy. With a cylindrical diode of this kind the emitted radiation spreads from each exit point in space and viewed in half a cross-sectional area of the cylinder the radiation spreads through an angle of $\pi$ radians, and only part of this radiation can be captured by the reflective surface.

The cylindrical diodes have a further disadvantage in that the radiation emanates through regions of different conductivity types and different transmissions. It is not only the absorption coefficients of the regions which are different, but owing to the difference in concentrations of free charge carriers the region of the lower concentration may exhibit a dielectric transmission characteristic and thus forms a selective filter passing only a narrow band of the emanating spectrum, and the region of the higher concentration may exhibit a metallic transmission characteristic and thus has great absorption and small selectivity. The spectrum of the beam emanating from the cylindrical diode as a sum of the passed spectra of the two diode regions is a complex spectrum, which is a great drawback for definite purposes.

In devices in which a less complex or even a monochromatic spectrum is required, it is necessary to select a portion of the irradiated spectrum by choosing one of the two regions of the crystal for passing the light emanating from the junction, which region preferably has a dielectric transmission or at least the lower concentration of free charge carriers.

The present invention obviates the aforesaid disadvantages and relates to an electro-luminescent diode of lateral emission, which permits on the one hand of increasing the fraction of the emitted radiation captured by a reflector of a given aperture and on the other hand, if desired and under given conditions, of restricting the spectrum of the emitted beam to the transmission spectrum of one of the two diode regions and to a radiation projector comprising such a diode.

According to the invention an electroluminescent, lateral-emission diode comprising a semiconductor crystal having a flat junction intersecting the side faces of the crystal and dividing the crystal into two regions of opposite conductivity types, said crystal having a strong refractive-index gradient transverse of the plane of the junction, is characterized in that said crystal is shaped in a form such that at least in the vicinity of said junction all lines of intersection of the side faces with the various planes of intersection going through an axis passing approximately through the centre of said junction at right angles thereto are directed obliquely to said axis so that all common points of the axis and of the various lines of intersection or their prolongations are located on the same side of the junction.

It is thus possible, by the choice of the angle between these lines of intersection and said axis, to control the intensity of the radiation from such a lateral-emission diode, as well as the ratio between the quantities of radiation emitted from the one and the other region of the diode.

Considering in one of the planes of intersection going through said axis one of the lines of intersection and one point of the junction, it will be obvious that all rays emanating from said point and leaving the crystal across the line of intersection are located within an angle 2λ (λ being the critical angle determined by the refractive indices of the crystal material and the ambient atmosphere for a given wavelength), the bisector of said angle passing through said point and being at right angles to the line of intersection concerned.

If this line of intersection (it being supposed for the sake of simplicity that this line is straight) is at an acute angle A with said axis, said bisector is located on the same side of the junction as the common point of the axis and the line of intersection, so that the radiation emanating from the diode region located on said side of the junction has a greater intensity than the radiation emanating from the region located on the other side of the junction. As long as A is smaller than λ, a portion of the radiation from said point emerges through the last-mentioned region. If A is equal to λ, the whole radiation emerges through the region located on the side of the common point, whereas the extreme rays (along one of the sides of the angle 2λ in the plane of intersection concerned) are located in the plane of the junction. If A is larger than λ, the whole radiation from said point emerges always from the side of the common point, while the said extreme rays also emerge from said side.

If A is equal to zero (with known cylindrical, lateral-emission diodes), the radiation emerges by half through each of the regions of the diode.

Said acute angle may therefore be chosen in accordance with the intended use of the diode; the choice of the region where the major portion of the radiation emerges is also made in accordance with the purpose aimed at.

In an advantageous embodiment the diode according to the invention has the shape of a cone or of a truncated cone, the bases (the flat surfaces) of which are parallel to the plane of the junction. If the diode forms part of a projector, the mirror is preferably a parabolic body of revolution, the axis of which coincides with the axis of the diode.

In a preferred embodiment the diode according to the invention has the shape of a truncated cone of revolution, in which the electro-luminescent junction is located in a plane at right angles to the axis of the cone. This diode will now be described in detail.

The invention is, of course, not restricted to a diode in the form of a body of revolution; the diode may have a conical, pyramidal or other shape with or without symmetrical elements; moreover, the aforesaid lines of intersection need not necessarily be straight.

In one embodiment of a diode having conical side faces, particularly for obtaining a radiation spectrum of minimum width, half the apex of the cone is at least equal to the critical angle corresponding to the refractive indices of the crystal and the ambience for the dominant component of the emerging spectrum, whilst the region of the lower concentration of free charge carriers and of the narrower transmission spectrum is located on that side of the junction where the top of the cone should be located.

In this embodiment the very small portion of the radiation emitted by the junction and reaching the region of the higher concentration of free charge carriers and the lower transmission coefficient is absorbed or totally reflected on the conical surfaces of the said region. On the contrary, the whole radiation in the region of the lower concentration of free charge carriers having an angle of indices to the conical surface smaller than said limit angle emerges from the diode.

The conical surfaces of such a diode, which forms the active, useful surface, has to be machined accurately, preferably optically polished. The two bases of the frustocone remain, however, available for applying the required contact elements for biassing the diode and for conducting away the heat.

In one embodiment of an electro-luminescent diode having conical side faces according to the invention, in which the maximum energetic efficiency should be obtained independently of the width of the available spectrum, half the apex of the cone is chosen to be smaller than the critical angle determined by the refractive indices of the semiconductor and its ambience for the dominant component of the emitted radiation.

In the latter embodiment the portion of the radiation emerging from points of the junction in a direction lying in the plane of the junction and/or along said junction due to the transverse gradient of the refractive index, which portion forms a fairly large part of the radiation emitted in total by the junction, passes through the two diode regions and strikes the conical surface at an angle of incidence smaller than the limit angle, and emerges for the major part from that part of the diode surface which is located in the direct vicinity of the line of intersection of the junction with this surface.

In a projector according to the invention the diametrical angle of aperture and the focal distance of the mirror, for example, a parabolic mirror, is determined not only by the desired section of the emitted beam but also by the following condition: the reflective surface of the mirror should be determined by the cone formed by the total radiation emerging from the side face of the diode or at least formed by the major part of said radiation.

In most cases the radiation emerging from the diode in a direction which is at very small angle to the generatrices of the conical plane of emergence may be neglected. This part of the emerging beam is formed by the rays located near the boundaries so that this part is strongly weakened, when emerging.

In a particular embodiment of a projector according to the invention, the diode comprises a gallium arsenide crystal in the form of a straight truncated cone of revolution, the apex of which points towards the top of the mirror, whilst the angle of origin of the cone is about 17°, when the diode is used in air. The region located near the top of the cone has n-type conductivity and a low concentration of free charge carriers. The diode is arranged so that the junction is located in the focal plane of the parabolic mirror. Such a device provides a beam having minimum dispersion and a very narrow spectrum having a dominant wavelength of 9000 A.

The diode is held in the focus of the associated mirror by means of a mechanical support matching the dimensions and the form of the device and consisting, for example, of three equidistant arms; this support should hinder as little as possible the radiation emerging from the diode and the reflected radiation. The support is preferably provided with control-members for the accurate adjustment of the position of the junction.

Although this particular embodiment of a projector provides a particularly advantageous solution of the problems of obtaining a high energetic output, of a low dispersion and of a narrow spectrum, it will be obvious that the invention is not restricted thereto and that the present invention also applies to devices comprising elliptical, spherical or differently shaped hollow mirrors and electroluminescent semiconductor diodes of the kind set forth. If it is desired to converge the projected beam at one point or a small, more proximate region, it may be important to use a mirror in the form of an ellipsoid; moreover, a parabolic, cylindrical mirror with a pyramidal diode may be used for obtaining a flat beam.

Although in most uses the ambience of the diode is formed by the atmospheric air, it may be advantageous or sometimes necessary to use the diode in a different medium passing the emitted radiation, which medium may be gaseous, liquid or even solid. The extreme angle of emergence of the radiation is then varied accordingly.

In a variant of the above-mentioned embodiments of the diode it is furthermore possible to join the radiation emitted by the junction in the direction towards the smaller base of the frustocone to the beam emanating from the conical surface; this base has then to be free of contact elements and it should have a suitable surface for radiation emission. The total quantity of energy irradiated by the diode is materially increased when the region of the higher transmission coefficient of the crystal is located on the side of said smaller base. In this variant the contact element of this region is applied to the side face near the smaller base of the frustocone.

In an advantageous embodiment of the invention, the light output of the diode is further increased, at least in a narrow band of the emitted spectrum, by means of a conventional anti-reflection treatment of the emissive surface, particularly the side face.

The dimensions of the diode according to the invention may be chosen in accordance with the purpose aimed at, since the limit values of these dimensions are determined only by the possibilities of manufacture.

The invention will now be described more fully with reference to the accompanying drawing.

Figure 1:
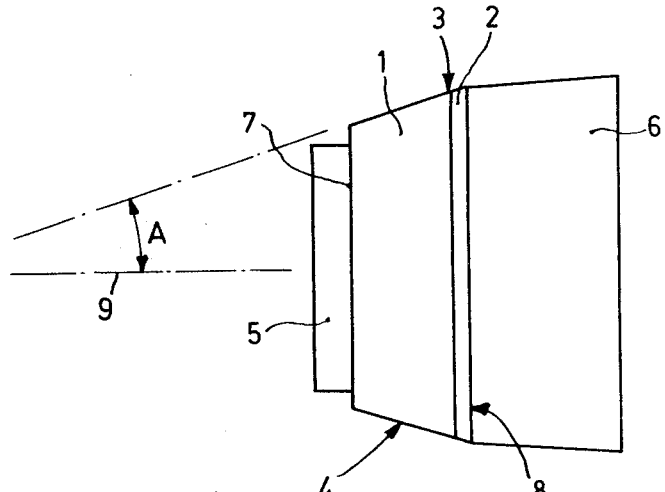
FIG. 1 is a diagrammatic cross-sectional view of a first embodiment of an electro-luminescent diode according to the invention.

The electro-luminescent, lateral-emission diode shown in FIG. 1 has the shape of a truncated cone of revolution and serves for producing a radiation in a narrow band of the spectrum. The diode comprises two regions 1 and 2 of different conductivity types, separated from each other by a flat junction 3 at right angles to the axis 9 of the frustocone, which junction intersects the side face 4 of this cone. The radiation emitted by the junction and emerging from the conical side face 4 of the diode has to lie within a narrow band of the spectrum and therefore, the apex A of the cone is chosen, as stated, above, slightly larger than the critical angle for total reflection, determined by the refractive indices of the semiconductor and the ambience for the dominant component of the emitted radiation.

The junction 3 may be obtained by diffusion and the whole crystal may initially have the conductivity type of the region 1. The two bases of the truncated cone form the flat outer faces 7 and 8 respectively of the regions 1 and 2 respectively. These faces have soldered to them contact elements 5 and 6 respectively, which may serve not only for the electrical connection but also, especially the element 6, for conducting away heat and, as the case may be, for supporting the diode.

The conical side face 4, the useful emissive face, may be obtained by grinding and finished by polishing.

In a practical embodiment the diode is made of gallium arsenide. The angle A is 17°, when the face 4 is in contact with air; the region 1 has n-type conductivity and a low concentration of free charge carriers and the region 2 has p-type conductivity and is obtained by zinc diffusion to a depth of $50\mu$, whilst the thickness of the crystal is 500 and the diameter of the junction is about 2 mms. The contact elements 5 and 6 preferably consist of copper and are soldered in known manner to the faces 7 and 8 respectively, so that a satisfactory electrical and thermal contact is established without the crystal being damaged.

Although the aforesaid values are given only by way of example for a practical embodiment of the invention, it is preferred, when a radiation in a narrow spectrum is desired, to choose for the region 1 the conductivity type which corresponds to the lower concentration of free charge carriers, whilst the thickness of this region is chosen so that the plane of emergence is as large as possible, taking into account that radiation emitted by central parts of the junction strikes the side face as far as possible from the junction at an angle equal to or smaller than the limit angle to this face.

The thickness of the region 2, where the emitted radiation reaches the side face at an angle larger than the limit angle and can therefore not emerge, is chosen to be as small as possible. This small thickness is furthermore conductive to the thermal dissipation of the junction to the contact element 6.

When the diode described above is combined with a reflector, particularly, with a parabolic mirror of revolution, it is possible to choose such an angle of aperture of the mirror that it captures the total flux emanating from the diode; if the junction of the diode is arranged in the focus of the mirror, the reflected beam is substantially cylindrical; the output of this device, even at a great distance, is excellent and the radiation has a very narrow spectrum.

Figure 2:
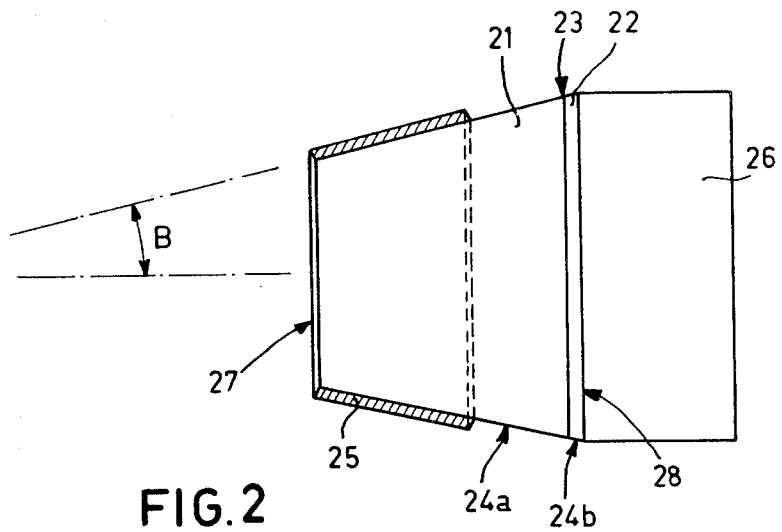
FIG. 2 is a diagrammatic sectional view of a second embodiment of the electro-luminescent diode according to the invention.

FIG. 2 shows an electro-luminescent diode according to the invention in which the energetic efficiency is optimum, whilst a wider spectrum is allowed for the emitted radiation. This diode also has the form of a truncated cone.

This diode has two regions 21 and 22, separated from each other by a flat junction 23, which intersects the side face of the frustocone and extends parallel to the bases 27 and 28 of the cone, which form the outer faces of the two regions. The flat face 28 of the region 22 is provided with a contact and cooling element 26. The face 27 is left free and the electrical contact with the region 21 is established by means of a metal ring 25, which is soldered to a zone of the conical face of the region 21 farthest remote from the junction.

With this diode not only the radiation emerging laterally from the conical face but also the radiation from the central part of the junction, emerging via the face 27, is utilized. In order to obtain a considerable increase of the total radiation energy by means of the radiation emerging from the face 27, it is preferred to have the region 21 of the crystal form the region of the higher transmission coefficient, and for this purpose the region 21 has to be the region of the lower concentration of the free charge carriers.

Half the apex B of the cone is slightly smaller than the limit angle determined by the refractice indices of the crystal and of the ambience for the emitted wavelength. The radiation extending substantially in the direction of the plane of the junction due to the refractive index gradient transverse of the junction and reaches the line of intersection 23 of the junction with the conical face and the radiation which reaches the conical face in the immediate proximity of the line of intersection 23, may emerge from the diode and raise the energetic efficiency as compared with the diode of FIG. 1, in which said radiation reaches the outer face at an angle equal to or larger than the limit angle, so that this radiation can emerge only for a small part at a very acute angle, it thus being drastically weakened by the refraction at the interface between the semiconductor crystal and the ambience.

The thickness of the region 21 is advantageously chosen so that the width of the zone 24a is sufficient for the radiation emanating from the central part of the junction to strike the parts of the surface of the zone 24a farthest remote from the junction at an angle of incidence substantially equal to the limit angle, whilst the width of the ring 25 has to be sufficient for providing a satisfactory contact surface, whereas the thickness of the region 22 is chosen to be sufficiently small to limit the absorption to permissible values. The diameter of the smaller base is preferably chosen to be sufficiently large to capture the whole radiation emanating from the central part of the junction at an angle equal to or smaller than the critical angle.

The two embodiments described above are intended for particular uses (selection of the emitted spectrum or an increase of the energetic efficiency), but other uses are possible, in which case other forms of the diode according to the invention are required. It is possible, for example, to invert the positions of the regions of the diode as compared with the diode described above or to provide a greater thickness of the region determined by the larger base of the cone than the thickness of the other region. The invention is furthermore not restricted to diodes having a diffused junction; other known forms of junctions may also be used.

Figure 3:
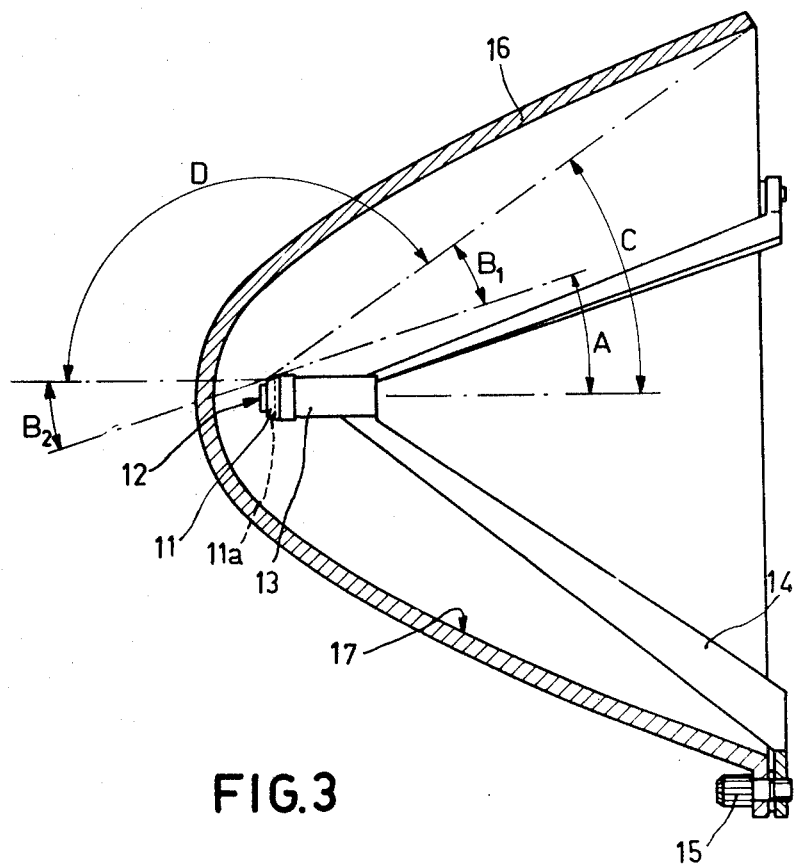
FIG. 3 is a sectional view of a projector according to the invention.

The projector shown in FIG. 3 comprises an electro-luminescent diode 11, the crystal of which has the shape of a truncated cone of revolution, the emissive face being formed by the conical side face with the angle of origin A. The junction 11a of the diode is flat and is at right angles to the axis of the frustocone and separates two regions from each other, one of which is located on the side of the top of the cone and is provided with a contact element 12, whereas the other region has a contact element 13, which is solid for conducting away heat from the junction. The diode 11 is supported from identical arms 14 at equal distance from each other, which are secured by means of screws 15 to a parabolic mirror 16 of revolution so that the junction 11a of the diode 11 is located in the focal plane of the mirror 16 and the axis of the mirror coincides with the axis of the conical face of the diode. The fastening of the arms 14 by means of the screws 15 is adjustable so that the junction can be accurately orientated.

The radiation emerging from the diode spreads from each point of the conical face in a solid angle of $2\pi$ radians, but the radiation emerging flush with the emissive surface are considerably weakened during the passage through the interface between the semiconductor crystal and the ambience and may be practically neglected as stated above. It is therefore not necessary to take into account the radiation emitted approximately in the solid angle $B_1$ of the space of revolution and neither the radiation emitted in the solid angle $B_2$ of the space of revolution, the latter radiation being, subsequent to reflection on the central mirror part, screened by the diode itself in any case. The whole useful radiation is therefore located substantially in the solid angle D, which is the complement to $B_1$ and $B_2$. It will be obvious that this radiation is completely captured by the reflective parabolic surface 17 and is reflected in a substantially parallel beam to the target.

The shape of the arms 14 is chosen so that the whole volume of useful radiation is left free. In order to hinder the reflected radiation as little as possible, these arms are formed from flat thin sheet, whilst the plane of this sheet extends parallel to the reflected radiation.

In a projector of the kind described an electro-luminescent diode of gallium arsenide with a junction diameter of 2 mms. may be used, the angle of origin of the cone being 17°; this diode is arranged at the focus of a parabolic mirror having a focal distance of 20 mms., a diametrical angle of aperture of 254 mms. and a depth of 200 mms. With these dimensions the angle C (see FIG. 3) is 35° and the angle D of the useful radiation is 145°. The angle of dispersion of the reflected beam is in this case smaller than 3°.

The projector described above is given only by way of example; within the scope of the invention various modifications are available to those skilled in the art.

What is claimed is:

1. An electro-luminescent diode having lateral emission, comprising a semiconductor crystal having regions of opposite conductivity type forming a planar p-n junction extending through the crystal to its side faces, said junction having an axis passing substantially through its center and at right angles thereto, said crystal having a refractive index gradient transverse of the junction plane which tends to confine generated rays along the said plane so that they emanate substantially from the side faces of the crystal in the vicinity of the junction, the side faces of said crystal being substantially conically shaped such that, at least in the vicinity of the junction, the lines of intersection, which are formed by the side faces of the crystal with all imaginary planes through said axis extend obliquely to said axis and said lines of intersection or their prolongations intersect the axis at a point on the same side of the junction, and means for making electrical contacts to the said regions.

2. A diode as set forth in claim 1 wherein the crystal is shaped such that the said lines of intersection are straight.

3. An electro-luminescent diode as set forth in claim 2 wherein the acute angle between each of said lines of intersection and said axis is slightly larger or slightly smaller than the critical angle for the dominant component of the emitted radiation.

4. A diode as set forth in claim 2 wherein the crystal regions have different concentrations of free charge carriers, the region having the lower concentration being thicker than the other region and being located on the same side of the junction as said common points.

5. A diode as set forth in claim 2 wherein the crystal has the shape of a truncated cone of revolution whose bases extend at right angles to the cone axis and parallel to the junction.

6. A diode as set forth in claim 5 wherein the contact means constitute opaque elements on the two cone bases.

7. A diode as set forth in claim 5 wherein the contact means comprise an opaque element on the larger cone base, and a contact element on the side face near the smaller base.

8. A diode as set forth in claim 4 wherein the region having the lower concentration has a thickness such that all rays emanating from points in the vicinity of the junction center and extending towards the side faces furthest from the junction impinge on said side faces at an angle at least equal to the critical angle.

9. A diode as set forth in claim 1 wherein the crystal is of gallium arsenide, the junction is made by diffusion, and the angle between the lines of intersection and the axis is about 17°.

10. A diode as claimed in claim 9, wherein the diode region located on the same side of the junction as the common points is n-type.

11. A radiation projector comprising the electro-luminscent diode of claim 1 in combination with a convergent hollow mirror, and means for mounting said diode within said mirror such that the smaller end of the crystal faces toward the top of the hollow mirror.

12. A projector as set forth in claim 11 wherein the mirror has the shape of a paraboloid, the diode junction is located in the focal plane of the mirror, and the said axis substantially coincides with the mirror axis.

13. A projector as set forth in claim 12 wherein the mounting means comprise flat arms secured to the mirror rim and whose major faces extend substantially parallel to the reflected radiation.

References Cited

UNITED STATES PATENTS

| | | | |
|---|---|---|---|
| 3,359,507 | 12/1967 | Hall | 317—235.27 |
| 3,370,174 | 2/1968 | Toussaint | 317—235.27 |
| 3,387,163 | 6/1968 | Queisser | 317—235.27 |
| 3,245,002 | 4/1966 | Hall | 317—235.27 |
| 3,302,051 | 1/1967 | Galginaitis | 317—235.27 |
| 3,443,140 | 5/1969 | Ing et al. | 317—235.27 |

FOREIGN PATENTS 1,126,817  12/1956  France.

OTHER REFERENCES

IBM Technical Disclosure Bulletin, vol. 8, No. 7, "Mount for Light Emitting Diode," December 1965.

IBM Technical Disclosure Bulletin, vol. 9, No. 7, "High-Efficiency Electro-luminescent Diodes," December 1966.

"New Semiconductors," Electronics, pp. 170, 172, Oct. 17, 1966.

NORTON ANSHER, Primary Examiner

R. P. GREINER, Assistant Examiner

U.S. Cl. X.R.

313—108; 317—235.27